(12) United States Patent
Qu et al.

(10) Patent No.: US 11,778,086 B2
(45) Date of Patent: Oct. 3, 2023

(54) INTER-DEVICE INTERACTIVE CONTROL METHOD, APPARATUS, AND STORAGE MEDIUM

(71) Applicant: BEIJING XIAOMI MOBILE SOFTWARE CO., LTD., Beijing (CN)

(72) Inventors: Jinping Qu, Beijing (CN); Juejia Zhou, Beijing (CN); Dian Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 10 days.

(21) Appl. No.: 17/380,686

(22) Filed: Jul. 20, 2021

(65) Prior Publication Data

US 2022/0232120 A1 Jul. 21, 2022

(30) Foreign Application Priority Data

Jan. 15, 2021 (CN) .......................... 202110057901.4

(51) Int. Cl.
*H04M 1/72457* (2021.01)
*H04M 1/72454* (2021.01)
*H04W 4/02* (2018.01)
*H04W 4/029* (2018.01)

(52) U.S. Cl.
CPC ... *H04M 1/72457* (2021.01); *H04M 1/72454* (2021.01); *H04W 4/026* (2013.01); *H04W 4/029* (2018.02)

(58) Field of Classification Search
CPC ......... H04M 1/72457; H04M 1/72454; H04W 4/026; H04W 4/70; H04L 67/125
See application file for complete search history.

(56) References Cited

U.S. PATENT DOCUMENTS

| | | | |
|---|---|---|---|
| 2018/0096683 A1* | 4/2018 | James | G10L 15/22 |
| 2018/0270617 A1* | 9/2018 | Zhang | G01S 5/0289 |
| 2020/0092124 A1* | 3/2020 | Jeong | H04L 12/2809 |
| 2020/0100056 A1 | 3/2020 | Takano | |
| 2020/0319074 A1 | 10/2020 | Park et al. | |
| 2021/0119885 A1* | 4/2021 | Flores Guerra | H04L 41/0806 |

FOREIGN PATENT DOCUMENTS

| | | |
|---|---|---|
| EP | 3328100 A1 | 5/2018 |
| WO | 2014131029 A2 | 8/2014 |

OTHER PUBLICATIONS

Extended European Search Report in Application No. 21188375.6, dated Jan. 20, 2022.

* cited by examiner

*Primary Examiner* — Minjung Kim
(74) *Attorney, Agent, or Firm* — SYNCODA LLC; Feng Ma (57) ABSTRACT

A inter-device interactive control method is applied to a first device, and includes: determining a location of the first device in a pre-established map; acquiring a target operation of the first device; determining a target operating device based on the location and the target operation of the first device; and performing operations on the determined target operating device.

17 Claims, 5 Drawing Sheets

FIG. 1

FIG. 2 in response to the operation of the first device pointing to the target operating device, determining an orientation of the first device after the orientation changing relative to the location of the first device in the pre-established map, and determining a location of the second device in the pre-established map ~ S31 determining a device at a location of the orientation corresponding to the location of the second device in the pre-established map as the target operating device ~ S32

FIG. 3 determining, in the smart space semantic map, a second device belonging to the same sub-area as the first device ~ S41

INTER-DEVICE INTERACTIVE CONTROL METHOD, APPARATUS, AND STORAGE MEDIUM

CROSS-REFERENCE TO RELATED APPLICATION

This application claims priority to Chinese Patent Application No. 202110057901.4 filed on Jan. 15, 2021, the disclosure of which is hereby incorporated by reference in its entirety.

BACKGROUND

With the development of technologies, the Internet of Things (IoT) can realize interconnections and intercommunications among various devices.

SUMMARY

The present disclosure generally relates to the technical field of device control, and more specifically to an inter-device interactive control method, an inter-device interactive control apparatus, and a storage medium.

According to a first aspect of the embodiments of the present disclosure, there is provided an inter-device interactive control method. Herein, the inter-device interactive control method is applied to a first device, and includes: determining the location of the first device in a pre-established map; acquiring the target operation of the first device; determining the target operating device based on the location and the target operation of the first device; and performing operations on the determined target operating device.

According to a second aspect of the embodiments of the present disclosure, there is provided an inter-device interactive control apparatus, including a processor; a memory device configured to store processor-executable instructions; wherein the processor is configured to invoke the instructions to execute the inter-device interactive control method described in the first aspect of the present disclosure or any implementation of the first aspect.

According to a third aspect of the embodiments of the present disclosure, a non-transitory computer-readable storage medium is provided, and when instructions in the storage medium are executed by a processor of a mobile terminal, it enables the mobile terminal to execute the inter-device interactive control method described in the first aspect of the present disclosure or any implementation of the first aspect.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the disclosure. Instead, they are merely examples of apparatuses and methods consistent with aspects related to the disclosure as detailed in the appended claims.

In a process of realizing device interconnection and intercommunication, users are often required to manually operate to control functions between devices.

An inter-device interactive control method provided by some embodiments of the present disclosure can be applied to an interactive control scenario between IoT devices, and can realize smart interconnections and intercommunications between various devices.

In some embodiments of the disclosure, an IoT device can be a smart terminal or a smart home device.

In the inter-device interactive control method provided in the present disclosure, a pre-established map may be provided with specific locations of all devices in a predetermined space (for example, a house with multiple rooms) and a location relationship between different devices. Taking a house with multiple rooms as the predetermined space as an example, the location information of any device in the predetermined space can be obtained through a map, and the location information may include the room, the locations in the room, etc. In the map, based on the location relationship between different devices, the location of any one device can be used to determine the locations of other devices.

Various embodiments of the present disclosure provide an inter-device interactive control method, which can determine the device that controls and implements the operations by determining the location of the device that performs operation controls on other devices in the pre-established map, the target operation implemented by the first device, and the location relationship between different devices in the map. Furthermore, the smart interactive control can be realized between the devices, ensuring that no manual operation by the user is required in the process of realizing the interconnection and intercommunication of the devices, so as to improve the user's experience and satisfaction during use.

In some embodiments of the present disclosure, for ease of description, the device that performs operation control on other devices is referred to as the first device, and the device that is controlled and performs operations is referred to as the target operating device.

Figure 1:
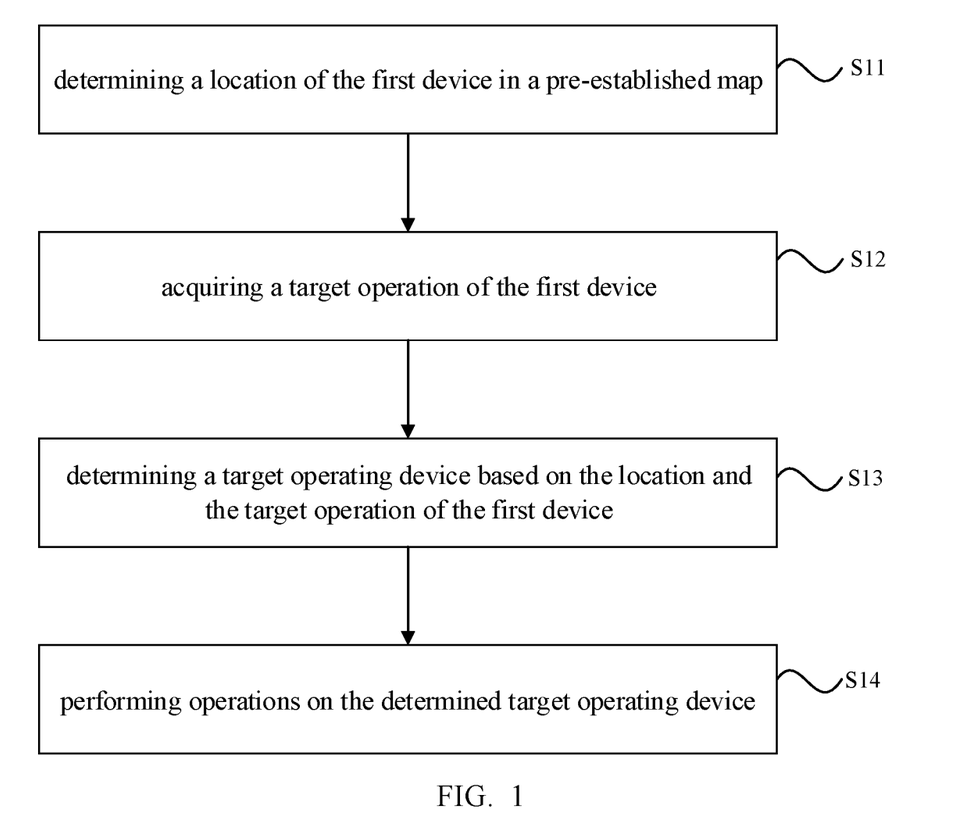
FIG. 1 is a flowchart showing an inter-device interactive control method according to some embodiments.

FIG. 1 is a flowchart showing an inter-device interactive control method according to some embodiments.

In some embodiments of the present disclosure, as shown in FIG. 1, the inter-device interactive control method may include step S11 to step S14, and each step will be introduced below respectively.

In step S11, the location of the first device in the pre-established map is determined.

In some embodiments, the first device may be a mobile terminal or a smart home device. In the application process, the location of the first device in the pre-established map can be determined by other devices with positioning functions.

In step S12, a target operation of the first device is acquired.

In an implementation, the target operation of the first device may be acquired, where the target operation may include an operation of the first device pointing to the target operating device, for example, an operation of the first device waving in the southwest direction at the current location to point to the target operating device. In the application process, the first device can be equipped with an inertial measurement unit (IMU). The first device can determine the target operation of the first device through the IMU.

In step S13, the target operating device is determined based on the location and the target operation of the first device.

In an implementation, the target operating device may be determined based on the location of the first device in the map, and the target operation performed by the first device (for example, the target operation is a pointing operation, such as the first device waving in the southwest direction at the current location). In the application process, based on the location relationship information of each device in the map, combined with the location of the first device in the map and the information of the first device waving in the southwest direction at its current location, the target operating device that the first device intends to position and control can be determined.

In the embodiments of the present disclosure, based on the location and the target operation of the first device, the direction and area location matching the location and the target operation can be determined, and the device included in the direction and the area location can be used as the target operating device. Herein, the number of target operating devices determined in the embodiments of the present disclosure may be one or more.

In the embodiments of the present disclosure, when there are multiple target operating devices, the second device that ultimately needs to be operated and controlled can be selected from the multiple devices.

As a possible embodiment, it is assumed that the target operation is a pointing operation, such as waving the first device in the southwest direction at the current location. Based on the location information of each device in the map, combined with the location of the first device in the map and the information of the first device waving in the southwest direction at its current location, when two target operating devices (where the target operating device 1 is nearby and the target operating device 2 is faraway) are determined, the target operating device to be determined by the first device can be determined in combination with the user's operation. In some embodiments, the two determined target operating devices may be displayed on the first device, and the user selects one target operating device from the two target operating devices as the target operating device that the first device intends to determine.

In some embodiments, when the waving information of the first device during performing the target operation is 2 waves, it may indicate that the target operating device that the first device intends to position and control is the distant target operating device 2. When the waving information of the first device during performing the target operation is 1 wave, it may indicate that the target operating device that the first device intends to position and control is the nearby target operating device 1.

It can be understood that the target operating device that the first device intends to determine is determined in combination with the waving information of the first device during performing the target operation, but it can also be determined according to actual conditions. In some embodiments, when the waving strength of the first device during the target operation exceeds the predetermined threshold, it means that the target operating device that the first device intends to position and control is the faraway target operating device 2. When the waving strength of the first device during the target operation does not exceed the predetermined threshold, it means that the target operating device that the first device intends to position and control is the nearby target operating device 1. In the present disclosure, no specific limitation is made to the determining of the target operating device that the first device intends to determine by combining the waving information of the first device during the target operation.

In step S14, operations are performed on the determined target operating device.

In some embodiments, the first device may perform operations or control on the positioned target operating device.

The inter-device interactive control method provided by the embodiments of the present disclosure can determine the target operating device by determining the location of the first device in a pre-established map, the target operation of the first device, and the location relationship between different devices in the map. Furthermore, smart interactive control can be realized between the first device and the target operating device, ensuring that no manual operation by the user is required in the process of realizing device interconnection and intercommunication, so as to improve the user's experience and satisfaction during use.

In a possible embodiment, the pre-established map may include a smart space semantic map. The process of determining the location of the first device in the pre-established map will be described through the following embodiments in combination with FIG. 2 in the present disclosure.

Figure 2:
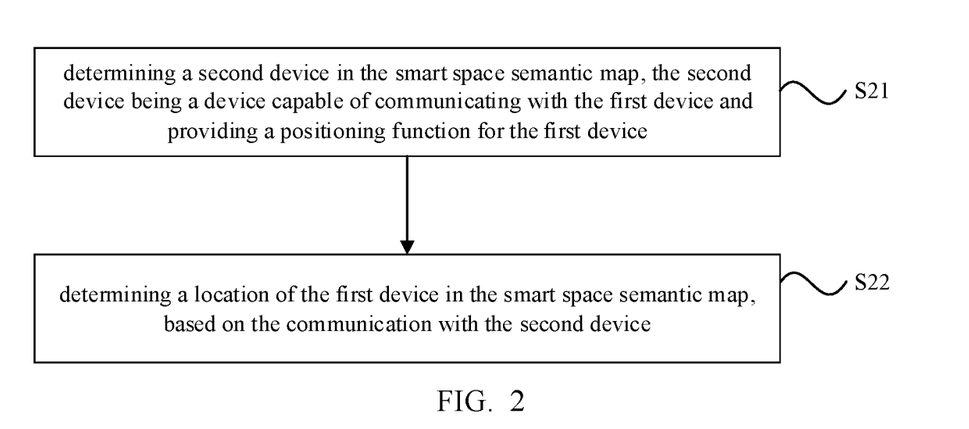
FIG. 2 shows a flowchart of determining a location of a first device in a pre-established map.

FIG. 2 shows a flowchart of determining a location of a first device in a pre-established map.

In an embodiment of the present disclosure, as shown in FIG. 2, determining the location of the first device in the pre-established map may include step S21 and step S22, and each step will be introduced below respectively.

In step S21, a second device is determined in the smart space semantic map, and the second device is a device capable of communicating with the first device and providing a positioning function for the first device.

In some embodiments, the second device may be a device with a fixed location in the smart space semantic map. Herein, the second device may be understood as a beacon device. In an example, such as in FIG. 6, the second device may be a TV A located in room R2 in a house including multiple rooms, and the TV A as a beacon device has fixed location coordinates, that is, the TV A located in room R2 has a fixed location in the smart space semantic map. Herein, the location coordinates may be the spatial location coordinates of the second device, or may be plane coordinates, such as the plane coordinates composed of the x-axis direction and the y-axis direction in FIG. 6.

In step S22, a location of the first device in the smart space semantic map is determined based on the communication with the second device.

It can be understood that the specific location of the first device in the smart space semantic map can be determined based on the positioning function of the second device. In some embodiments, the first device and the second device may both be provided with a positioning module, such as an ultra-wideband (UWB) positioning module, and the precise positioning of the second device to the first device can be realized based on the ultra-wideband positioning technology. Further, in combination with the pointing direction of the first device and the location relationship between different devices in the smart space semantic map, the positioning or control of the target operating device by the first device can be realized.

In some embodiments, the first device may be a mobile terminal, and the second device communicates with the first device based on ultra-wideband technology, and it can be determined that the first device is located 3 meters southwest of the second device. During the application process, since the second device has a fixed location in the smart space semantic map, combined with the first device located 3 meters southwest of the second device, the location of the first device in the smart space semantic map can be obtained.

Through the present embodiment, the location of the first device in the smart space semantic map can be determined based on the second device, and foundation is laid for the first device to position or control a target operating device that does not have the function of being positioned. It can be understood that there may exist multiple devices in the smart space semantic map which can communicate with the first device and provide a positioning function for the first device. In the application process, one or more second devices can be determined among multiple devices, and based on the second devices, the location of the first device in the smart space semantic map can be determined.

The process of determining the second device in the smart space semantic map will be described through the following embodiments in the present disclosure.

In some embodiments of the present disclosure, in response to the presence of multiple devices which can communicate with the first device and provide the first device with a positioning function, in the smart space semantic map, one or more second devices satisfying the predetermined conditions may be determined among multiple devices.

Herein, the predetermined conditions include one or a combination of the following conditions: the second device may be a device with the smallest distance from the first device. The second device may be a device selected by the user. The second device may be a device with the same type of positioning component as the first device. The second device may also be a device located in a designated orientation of the first device.

In an example, the device with the smallest distance from the first device may be selected among multiple devices capable of providing a positioning function for the first device as the second device. The location of the first device in the smart space semantic map is determined based on the second device. In this way, since the second device is closest to the first device, the location of the first device in the smart space semantic map can be determined more quickly and accurately.

In another example, a device selected by the user may be selected as the second device among multiple devices capable of providing a positioning function for the first device. The location of the first device in the smart space semantic map is determined based on the second device. It can be understood that selecting the second device based on the user's instruction can improve the user's experience and satisfaction during use.

In yet another example, a device with the same type of positioning component as the first device may be selected as the second device among multiple devices capable of providing a positioning function for the first device. The location of the first device in the smart space semantic map is determined based on the second device. In an example, both the first device and the second device may be provided with an ultra-wideband positioning module. The first device and the second device have the same type of positioning components, which can avoid the problem where the positioning speed is too slow due to incompatibility in different positioning components.

In yet another example, a device located in a specified orientation of the first device may be selected as the second device among multiple devices capable of providing a positioning function for the first device. The location of the first device in the smart space semantic map is determined, based on the second device.

The target operation of the first device may include an operation in which the first device points to the target operating device. The process of determining the target operating device based on the location and the target operation of the first device will be described through the following embodiments in the present disclosure.

Figure 3:
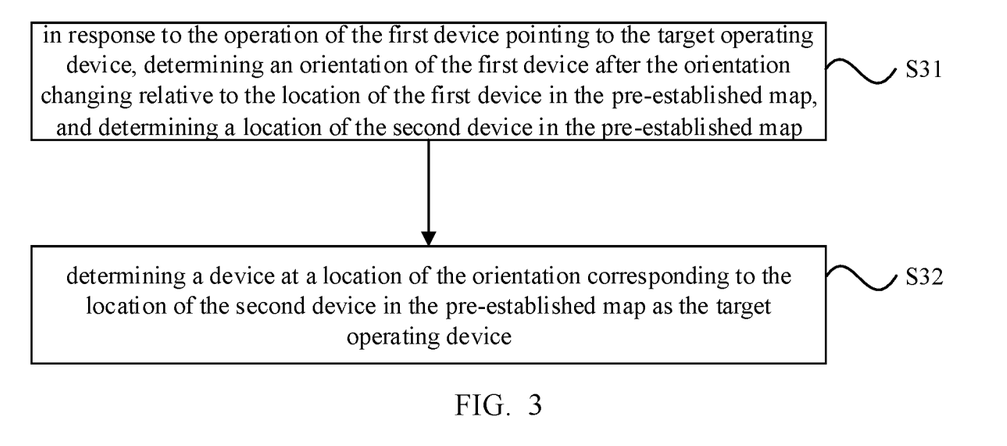
FIG. 3 shows a flowchart of determining a target operating device.

FIG. 3 shows a flowchart of determining a target operating device.

In an embodiment of the present disclosure, as shown in FIG. 3, determining the target operating device may include step S31 and step S32, and each step will be introduced below respectively.

In step S31, in response to the operation of the first device pointing to the target operating device, an orientation of the first device after the orientation changing relative to the location of the first device in the pre-established map is determined, and a location of the second device in the pre-established map is determined.

In step S32, a device at a location of the orientation corresponding to the location of the second device in the pre-established map is determined as the target operating device.

In some embodiments, the target operation of the first device may include an operation in which the first device points to the target operating device. When the operation of the first device pointing to the target operating device is detected, the orientation of the first device after the orientation changing relative to the location of the first device in the pre-established map can be determined. In an example, the first device is currently located 3 meters southwest of the second device, and the first device is waved along the southwest direction at the current location to point to the target operating device.

In another embodiment, the target operation of the first device may also include an operation in which the first device is moved and approached to the target operating device. In an example, when it is detected that the first device is moved and approached to the target operating device, the orientation of the first device after the orientation changing relative to the location of the first device in the pre-established map can be determined. In an example, the first device is currently located 3 meters southwest of the second device, and the first device is carried by the user to the target operating device along the southwest direction at the current location.

In this way, the first device can determine the target operating device and the location of the target operating device in the smart space semantic map by means of the second device, laying a foundation for the first device to perform operations on the target operating device. In this way, it is possible to realize the operation control of the first device on the target operating device that does not have the function of being positioned, thereby not only realizing the interconnection and intercommunication of various devices, but also reducing the device manufacturing cost.

It can be understood that the smart space semantic map may include sub-areas for distinguishing multiple different spatial locations, and the sub-areas also carry semantic label data that characterizes the association relationship between the sub-areas, which can be understood as different sub-areas logics in the predetermined space established and obtained by the smart space semantic maps, where the sub-area logic limits the interactive control of the devices in the sub-areas. The sub-area can correspond to a room in the space of the smart home. In the application process, the first device can realize positioning and control of the target operating device located in the same sub-area by means of the second device located in the same sub-area.

The process of determining the second device in the smart space semantic map will be described through the following embodiments in the present disclosure.

In an embodiment of the present disclosure, the second device belonging to the same sub-area as the first device may be determined in the smart space semantic map. Further, the second device can communicate with the first device to determine the location of the first device in the smart space semantic map, and combined with the target operation of the first device, determine the target operating device and the location of the target operating device in the smart space semantics map. Since the smart space semantic map establishes different sub-area logics in the predetermined space, in the application process, the first device can realize the positioning and control of the target operating device located in the same sub-area by means of the second device located in the same sub-area.

In another embodiment, the smart space semantic map may include sub-areas for distinguishing multiple different spatial locations, and the sub-areas also carry semantic label data that characterizes the association relationship between the sub-areas, which can be understood as different sub-areas logics in the predetermined space established by the smart space semantic maps. The sub-area can correspond to a room in the space of the smart home. Herein, devices between different sub-areas controlled correspondingly by different sub-area logics cannot be interactively controlled, and devices in the same sub-area can interactively control each other.

The process of determining the second device in the smart space semantic map will be described through the following embodiments in the present disclosure.

Figure 4:
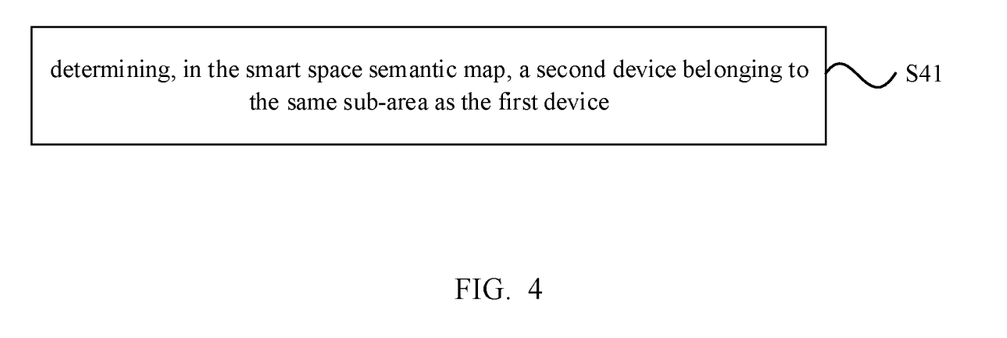
FIG. 4 shows a flowchart of determining a second device in a smart space semantic map.

FIG. 4 shows a flowchart of determining a second device in a smart space semantic map.

In an embodiment of the present disclosure, as shown in FIG. 4, determining the second device in the smart space semantic map may include step S41.

In step S41, a second device belonging to the same sub-area as the first device is determined in the smart space semantic map.

In some embodiments, because the smart space semantic map establishes different sub-area logics in the predetermined space, the first device cannot realize the positioning and control of the target operating device located in a different sub-area by means of the second devices located in different sub-areas.

In the application process, the first device can realize the positioning and control of the target operating device located in a different sub-area by means of the second devices located in different sub-areas.

Herein, one or more sub-areas which are the same as the sub-areas to which the first device belongs may be determined as one or more sub-areas for determining the second device. The second device is determined in one or more sub-areas.

In an example, the user can preset to release the different sub-area logics established by the smart space semantic map. In the application process, when it is detected that the first device is set to determine the second device in different sub-areas, multiple sub-areas for determining the second device can be determined. The second device is determined in multiple sub-areas. In some embodiments, the location of the first device in the smart space semantic map may be determined based on the second devices located in different sub-areas, and combined with the target operation of the first device, the target operating device and the location of the target operating device in the smart space semantic map are determined.

In another embodiment, the first device can independently break through the different sub-area logics in the smart space semantic map according to the association relationship between the sub-areas. That is, the first device can independently break through the relative isolation between the sub-areas, and determine the second device in one or more sub-areas different from the sub-area to which the first device belongs. In some embodiments, the location of the first device in the smart space semantic map may be determined based on the second devices located in different sub-areas, and combined with the target operation of the first device, the target operating device and the location of the target operating device in the smart space semantic map are determined.

The process of performing operations on the determined target operating device will be described in combination with FIG. 5 through the following embodiments in the present disclosure.

Figure 5:
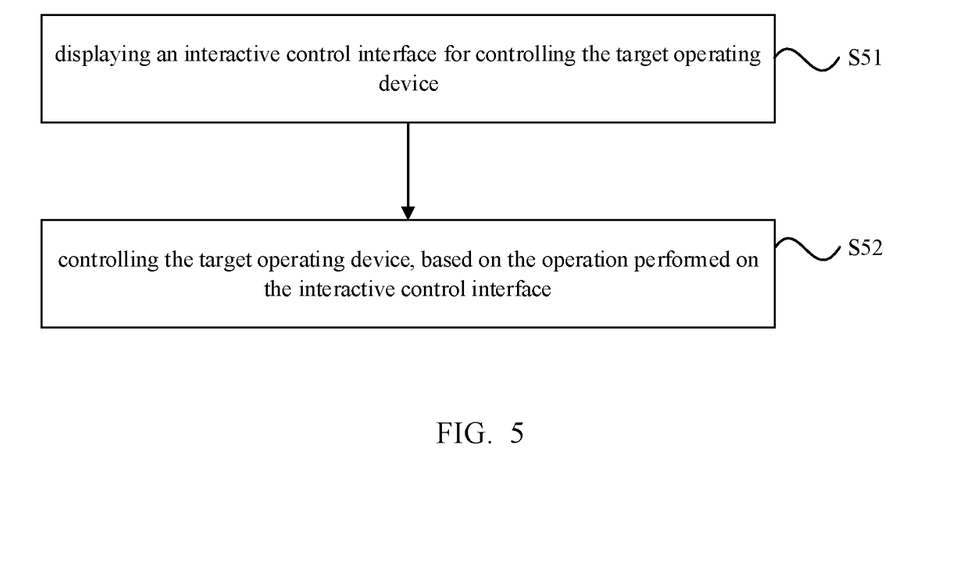
FIG. 5 shows a flowchart of performing operations on a determined target operating device.

FIG. 5 shows a flowchart of performing operations on a determined target operating device.

In an embodiment of the present disclosure, as shown in FIG. 5, performing operations on the determined target operating device may include step S51 to step S52, and various steps will be introduced below respectively.

In step S51, an interactive control interface for controlling the target operating device is displayed.

In step S52, based on the operation performed on the interactive control interface, the target operating device is controlled.

In some embodiments, an interactive control interface for controlling the target operating device may be displayed on the first device, and the target operating device may be controlled based on operations performed on the interactive control interface. In some embodiments, prior to performing step S51, a step of establishing a connection with the determined target operating device (not shown) may be performed.

In the embodiments of the present disclosure, if there are multiple determined target operating devices, the interactive control interface of the multiple target operating devices may be displayed.

In an example, the first device is a mobile terminal, and the target operating devices are a smart speaker and a humidifier. An interactive control interface for controlling the smart speaker and the humidifier is displayed on the mobile terminal. The mobile terminal can realize the control of the smart speaker based on the operation performed on the interactive control interface.

Figure 6:
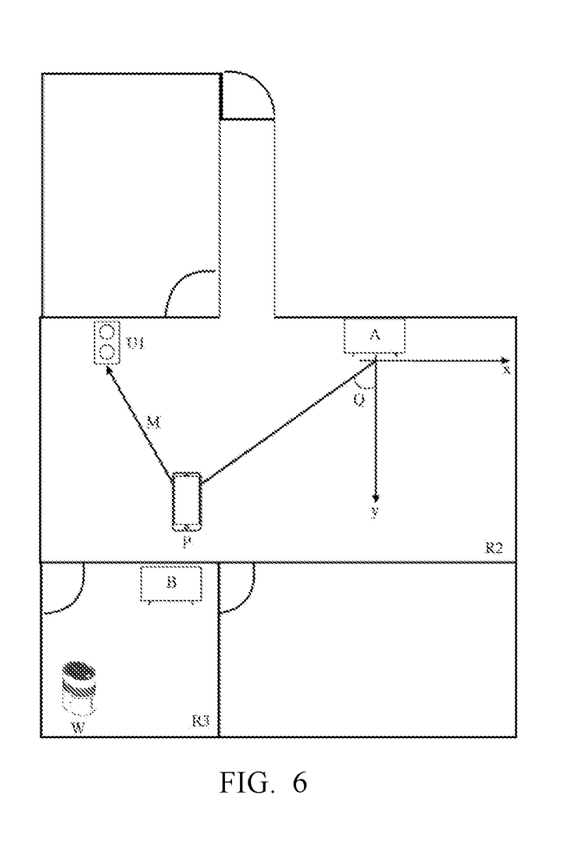
FIG. 6 shows a schematic diagram of a scenario in which the inter-device interactive control method shown in some embodiments of the present disclosure is applied.

FIG. 6 shows a schematic diagram of a scenario in which the inter-device interactive control method shown in the embodiments of the present disclosure is applied.

With reference to FIG. 6, taking the first device as the mobile terminal P, the second device as the TV B, and the target device as the humidifier W as an example, the process of determining the target operating device by the first device based on the second device will be described.

In an example, the mobile terminal P is located in the room R2. When it is detected that the mobile terminal P points to the southwest direction at the current location, it can be determined that the target operating device that the mobile terminal P intends to control is the humidifier W.

In some embodiments of the present disclosure, as shown in FIG. 6, the first device is the mobile terminal P, the second device is the TV A, and the target device is the speaker U1 as an example for description. Among them, TV A is a beacon device, which can establish the location coordinates of TV A in the x direction and the y direction.

In an example, the mobile terminal P is located in the room R2. For ease of description, let Q be an angle of 45°, and it can be detected that the mobile terminal P is located 3 meters southwest of the TV A. Further, the location of the mobile terminal P in the smart semantic space map can be determined based on the TV A.

When it is detected that the mobile terminal P is waving in the M direction at the current location, in the application process, based on the location relationship information of each device in the smart space semantic map, combined with the location of the mobile terminal P in the smart space semantic map and the information that the mobile terminal P is waving along the M direction at the current location, it can be determined that the target operating device of the mobile terminal P is the speaker U1. It can be understood that if there are multiple speakers such as speakers U1, U2, etc. in the embodiment of the present disclosure, the multiple speakers can be displayed.

It can be understood that in the embodiments of the present disclosure, the aforementioned speaker U1, speaker U2, TV A, and TV B may be devices in the same sub-area, or devices in different sub-areas. With the help of TV A, the mobile terminal P realizes the operation control on the speaker U1 which does not have the function of being positioned, and thus can realize the interconnection and intercommunication between the mobile terminal P and the speaker U1. Since the speaker U11 is not equipped with a positioning module, the manufacturing cost of the speaker U1 can be reduced.

According to the above description, the inter-device interactive control method provided by the embodiments of the present disclosure can determine the target operating device by determining the location of the first device in a pre-established map, the target operation of the first device, and the location relationship between different devices in the map. Furthermore, the smart interactive control can be realized between the first device and the target operating device, ensuring that no manual operation by the user is required in the process of realizing device interconnection and intercommunication, so as to improve the user's experience and satisfaction during use.

Based on the same concept, embodiments of the present disclosure also provide an inter-device interactive control apparatus.

It can be understood that, in order to implement the above-mentioned functions, the inter-device interactive control apparatus provided by the embodiments of the present disclosure includes hardware structures and/or software modules corresponding to each function. In combination with the units and algorithm steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 7:
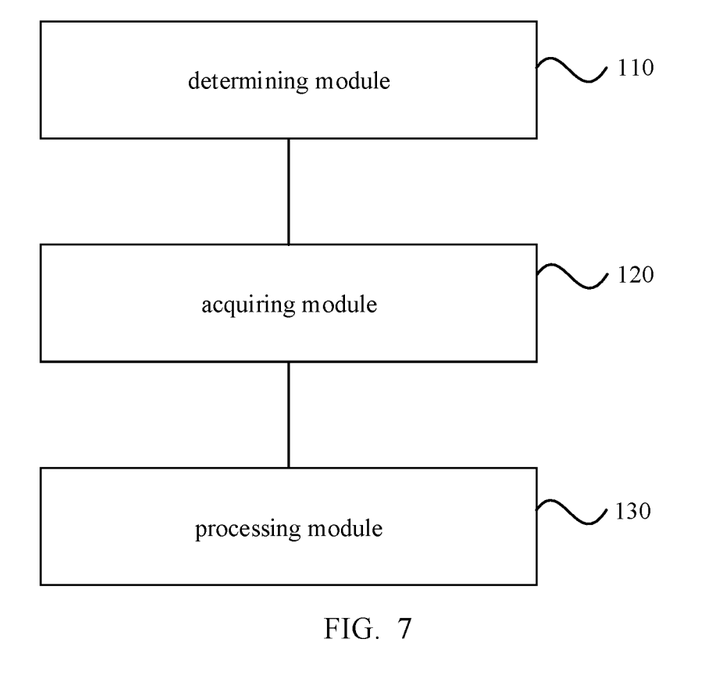
FIG. 7 is a block diagram showing an inter-device interactive control apparatus according to some embodiments.

FIG. 7 is a block diagram showing an inter-device interactive control apparatus according to some embodiments.

In an embodiment of the present disclosure, the inter-device interactive control apparatus may be applied to the first device. As shown in FIG. 7, the inter-device interactive control apparatus may include a determining module 110, an acquiring module 120, and a processing module 130. Each module will be introduced below respectively.

The determining module 110 can be configured to determine the location of the first device in a pre-established map.

The acquiring module 120 can be configured to acquire a target operation of the first device.

The processing module 130 can be configured to determine a target operating device based on the location and the target operation of the first device, and perform operations on the determined target operating device.

In an embodiment of the present disclosure, the pre-established map may include a smart space semantic map. The determining module 110 can be configured to determine the location of the first device in the pre-established map in the following manner: determining a second device in the smart space semantic map, the second device being a device capable of communicating with the first device and providing a positioning function for the first device; and determining a location of the first device in the smart space semantic map, based on the communication with the second device.

In an embodiment of the present disclosure, the determining module 110 can be configured to determine the second device in the smart space semantic map in the following manner: in response to the presence of multiple devices capable of communicating with the first device and providing a positioning function for the first device in the smart space semantic map, determining one or more second devices satisfying predetermined conditions among the multiple devices; wherein the predetermined conditions comprise one or a combination of the following conditions: the second device is the device with the smallest distance from the first device; the second device is a device selected by a user; the second device is a device having the same type of positioning component as the first device; and the second device is a device located in a designated orientation of the first device.

In an embodiment of the present disclosure, the target operation of the first device may include an operation of the first device pointing to the target operating device; and the processing module 130 can be configured to determine the target operating device based on the location and the target operation of the first device in the following manner: in response to the operation of the first device pointing to the target operating device, determine the orientation of the first device after the orientation changing relative to the location of the first device in the pre-established map, and determine the location of the second device in the pre-established map; and determine a device at a location of the orientation corresponding to the location of the second device in the pre-established map, as the target operating device, and determine the location of the target operating device in the pre-established map.

In an embodiment of the present disclosure, the smart space semantic map includes sub-areas for distinguishing multiple different spatial locations and the determining module 110 can be configured to determine the second device in the smart space semantic map in the following manner: determining a second device belonging to the same sub-area as the first device in the smart space semantic map.

In an embodiment of the present disclosure, the smart spatial semantic map may include sub-areas for distinguishing multiple different spatial locations. The determining module 110 can be configured to determine the second device in the smart space semantic map in the following manner: determining one or more sub-areas different from the sub-areas to which the first device belongs as one or more sub-areas used to determine the second device; and determining the second device within the one or more sub-areas.

In an embodiment of the present disclosure, the processing module 130 can be configured to perform operations on the determined target operating device in the following manner: establishing a connection with the determined target operating device; displaying an interactive control interface for controlling the target operating device; and controlling the target operating device, based on the operation performed on the interactive control interface.

With respect to the devices in the above embodiments, the specific manners for performing operations for individual modules therein have been described in detail in the embodiments regarding the methods, which will not be elaborated herein.

Figure 8:
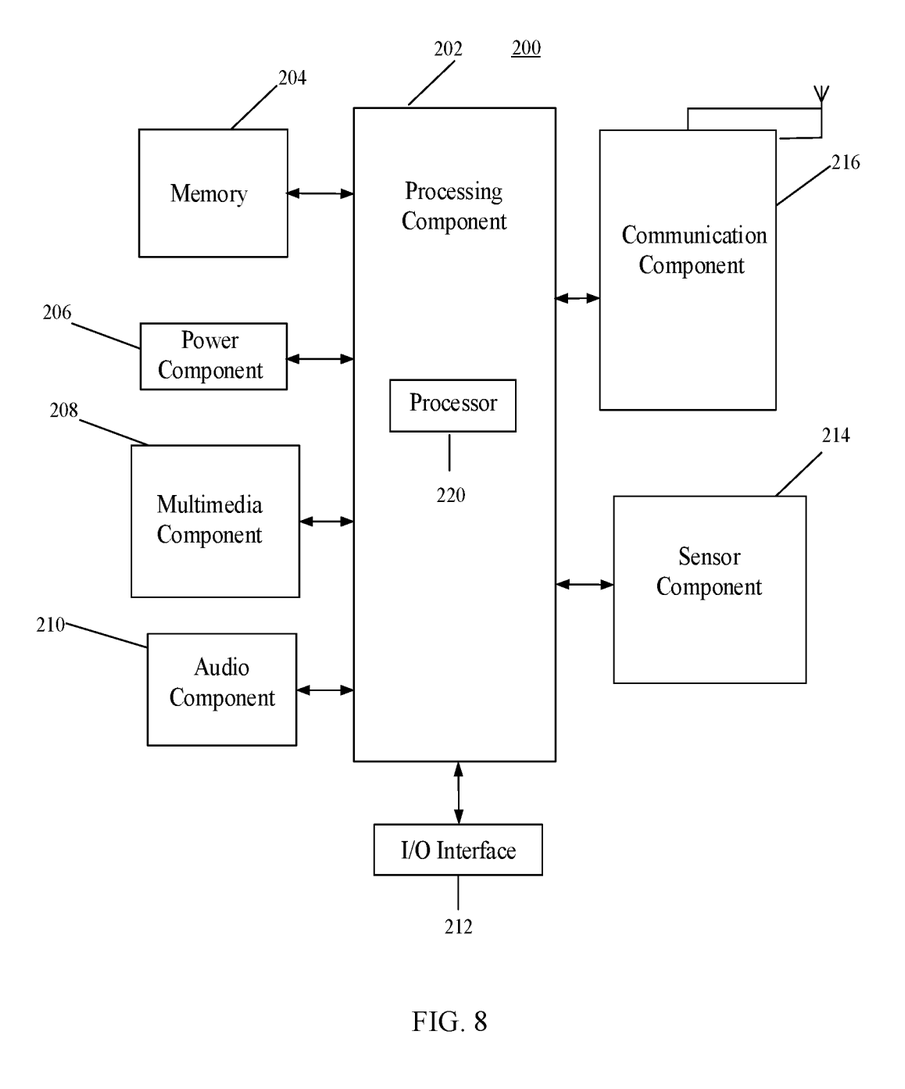
FIG. 8 is a block diagram showing an apparatus for interactive control between devices according to some embodiments.

FIG. 8 is a block diagram of an apparatus 200 for interactive control between devices, according to some embodiments. For example, the apparatus 200 for interactive control between devices can be a mobile phone, a computer, a digital broadcast terminal, a messaging device, a gaming console, a tablet, a medical device, exercise equipment, a personal digital assistant, etc.

Referring to FIG. 8, the apparatus 200 for interactive control between devices can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200 for interactive control between devices, such as the operations associated with display, telephone calls, data communications, camera operations, and recording operations. The processing component 202 can include one or more processors 220 to execute instructions to perform all or part of the steps in the above described inter-device interactive control methods. Moreover, the processing component 202 can also include one or more modules which facilitate the interaction between the processing component 202 and other components. For instance, the processing component 202 can also include a multimedia module to facilitate the interaction between the multimedia component 208 and the processing component 202.

The memory 204 may be configured to store various types of data to support the operation of the apparatus 200 for interactive control between devices. Examples of such data include instructions for any applications or methods operated on the apparatus 200 for interactive control between devices, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or optical disk.

The power component 206 may provide power to various components of the apparatus 200 for interactive control between devices. The power component 206 can also include a power management system, one or more power sources, and any other components associated with the generation, management, and distribution of power in the apparatus 200 for interactive control between devices.

The multimedia component 208 may include a screen providing an output interface between the apparatus 200 for interactive control between devices and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensor may not only sense a boundary of a touch or swipe action, but also sense the duration and pressure associated with the touch or swipe action. In some embodiments, the multimedia component 208 may include a front camera and/or a rear camera. When the apparatus 200 for interactive control between devices is in an operation mode, such as a photographing mode or a video mode, the front camera and the rear camera can receive external multimedia datum. Each front camera and the rear camera can be a fixed optical lens system or have focus and optical zoom capabilities.

The audio component 210 may be configured to output and/or input audio signals. For example, the audio component 210 can include a microphone (MIC) configured to receive an external audio signal when the apparatus 200 for interactive control between devices is in an operation mode, such as a call mode, a recording mode, or a voice recognition mode. The received audio signal can be further stored in the memory 204 or transmitted via the communication component 216. In some embodiments, the audio component 210 can further include a speaker to output audio signals.

The I/O interface 212 may provide an interface between the processing component 202 and peripheral interface modules, such as a keyboard, a click wheel, buttons, etc. The buttons can include, but are not limited to, a home button, a volume button, a start button, and a lock button.

The sensor component 214 may include one or more sensors to provide status assessments of various aspects of the apparatus 200 for interactive control between devices. For instance, the sensor component 214 can detect an open/closed status of the apparatus 200 for interactive control between devices, relative positioning of components, e.g., the display and the keypad, of the apparatus 200 for interactive control between devices, a change in location of the apparatus 200 for interactive control between devices or a component of the apparatus 200 for interactive control between devices, a presence or absence of user contact with the apparatus 200 for interactive control between devices, an orientation or an acceleration/deceleration of the apparatus 200 for interactive control between devices, and a change in temperature of the apparatus 200 for interactive control between devices. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 may be configured to facilitate wired or wireless communication between the apparatus 200 for interactive control between devices and other devices. The apparatus 200 for interactive control between devices can access a wireless network based on a communication standard, such as Wi-Fi, 2G, 3G, 4G, 5G or a combination thereof. In some embodiments, the communication component 216 can receive a broadcast signal or broadcast associated information from an external broadcast management system via a broadcast channel. In one exemplary embodiment, the communication component 216 can further include a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, or other technologies.

In some embodiments, the apparatus 200 for interactive control between devices can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, such as included in the memory 204, executable by the processor 220 in the apparatus 200 for interactive control between devices, for performing the above-described inter-device interactive control methods. For example, the non-transitory computer-readable storage medium can be a ROM, a random access memory (RAM), a CD-ROM, a magnetic tape, a floppy disc, an optical data storage device, etc.

Various embodiments of the present disclosure can have one or more of the following advantages.

The target operating device can be determined by determining the location of the first device in the pre-established map, the target operation of the first device, and the location relationship between different devices in the map. Furthermore, the smart interactive control can be realized between the first device and the target operating device, to ensure that users do not need to operate manually in the process of realizing the interconnection and intercommunication of devices, so as to improve the user's experience and satisfaction during use.

It can be understood that the "multiple" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," "said," and "the" are also intended to include the plural forms unless the context clearly indicates otherwise.

It can be further understood that although the terms such as "first" and "second" and the like are used to describe various information, these information should not be limited by these terms. The terms are only used to distinguish the same type of information from each other, and do not indicate a specific order or importance. In fact, the expressions such as "first" and "second" and the like can be used interchangeably. For instance, first information can also be referred to as second information without departing from the scope of the disclosure, and similarly, the second information can also be referred to as the first information.

In the drawings, the same or similar reference numerals indicate the same or similar elements or elements with the same or similar functions. The described embodiments are part of the embodiments of the present disclosure, but not all of the embodiments. The embodiments described above with reference to the accompanying drawings are exemplary, and are intended to explain the present disclosure, but should not be construed as limiting the present disclosure. Based on the embodiments in the present disclosure, all other embodiments obtained by those of ordinary skill in the art without creative work shall fall within the protection scope of the present disclosure. The embodiments of the present disclosure are described in detail above with reference to the accompanying drawings.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HIVID) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An inter-device interactive control method, applied to a first device, the method comprising:
   determining a location of the first device in a pre-established map;
   acquiring a target operation of the first device;
   determining a target operating device that does not have a function of being positioned based on the location and the target operation of the first device; and
   performing operations on the determined target operating device,
   wherein the pre-established map comprises a smart space semantic map comprising sub-areas for distinguishing multiple different spatial locations; and
   the method further comprises: determining a second device in the smart space semantic map,
   the second device being a device capable of communicating with the first device and providing a positioning function for the first device; and
   determining a location of the first device in the smart space semantic map, based on the communication with the second device;
   based on the location of the first device and location relationship between the first device and the second device, determining the target operating device that does not have a function of being positioned.

2. The inter-device interactive control method according to claim 1, wherein the determining the second device in the smart space semantic map comprises:
   in response to the presence of multiple devices capable of communicating with the first device and providing a positioning function for the first device in the smart space semantic map, determining one or more second devices satisfying predetermined conditions among the multiple devices;
   wherein the predetermined conditions comprise one or a combination of the following conditions:
   the second device is a device with the smallest distance from the first device;
   the second device is a device selected by a user;
   the second device is a device having the same type of positioning component as the first device; and
   the second device is a device located in a designated orientation of the first device.

3. The inter-device interactive control method according to claim 1, wherein
   the determining the second device in the smart space semantic map comprises:
   determining, in the smart space semantic map, a second device belonging to the same sub-area as the first device.

4. The inter-device interactive control method according to claim 1, wherein
   the determining the second device in the smart space semantic map comprises:

determining one or more sub-areas different from the sub-areas to which the first device belongs as one or more sub-areas used to determine the second device; and determining the second device within the one or more sub-areas.

5. The inter-device interactive control method according to claim 1, wherein the target operation of the first device comprises an operation of the first device pointing to the target operating device; and the determining a target operating device based on the location and the target operation of the first device comprises:

in response to the operation of the first device pointing to the target operating device, determining an orientation of the first device after the orientation changing relative to the location of the first device in the pre-established map, and determining a location of the second device in the pre-established map; and determining, a device at a location of the orientation corresponding to the location of the second device in the pre-established map, as the target operating device, and determining a location of the target operating device in the pre-established map.

6. The inter-device interactive control method according to claim 1, wherein the performing operations on the determined target operating device comprises:

establishing a connection with the determined target operating device;

displaying an interactive control interface for controlling the target operating device; and controlling the target operating device, based on the operation performed on the interactive control interface.

7. A non-transitory computer-readable storage medium, when instructions in the storage medium are executed by a processor of a mobile terminal, enabling the mobile terminal to implement the inter-device interactive control method according to claim 1.

8. The non-transitory computer-readable storage medium according to claim 7, wherein the determining the second device in the smart space semantic map comprises:

in response to the presence of multiple devices capable of communicating with the first device and providing a positioning function for the first device in the smart space semantic map, determining one or more second devices satisfying predetermined conditions among the multiple devices;

wherein the predetermined conditions comprise one or a combination of the following conditions:

the second device is a device with the smallest distance from the first device;

the second device is a device selected by a user;

the second device is a device having the same type of positioning component as the first device; and the second device is a device located in a designated orientation of the first device.

9. The non-transitory computer-readable storage medium according to claim 7, wherein the determining the second device in the smart space semantic map comprises:

determining, in the smart space semantic map, a second device belonging to the same sub-area as the first device.

10. The non-transitory computer-readable storage medium according to claim 7, wherein the target operation of the first device comprises an operation of the first device pointing to the target operating device; and the determining a target operating device based on the location and the target operation of the first device comprises:

in response to the operation of the first device pointing to the target operating device, determining an orientation of the first device after the orientation changing relative to the location of the first device in the pre-established map, and determining a location of the second device in the pre-established map; and determining, a device at a location of the orientation corresponding to the location of the second device in the pre-established map, as the target operating device, and determining a location of the target operating device in the pre-established map.

11. An Internet of Things (IoT) system implementing the inter-device interactive control method according to claim 1, comprising the first device and the target operating device, wherein the target operating device is determined by:

the location of the first device determined in the pre-established map;

the target operation of the first device; and a location relationship among different devices in the pre-established map;

thereby realizing a smart interactive control between the first device and the target operating device without user manual operation in realizing interconnections and intercommunications among the different devices.

12. An inter-device interactive control apparatus, applied to a first device, the apparatus comprising:

a memory device configured to store processor-executable instructions;

a processor configured to:

determine a location of the first device in a pre-established map;

acquire a target operation of the first device; and determine a target operating device that does not have a function of being positioned based on the location and the target operation of the first device, and perform operations on the determined target operating device, wherein the pre-established map comprises a smart space semantic map comprising sub-areas for distinguishing multiple different spatial locations; and the processor is further configured to determine a second device in the smart space semantic map, the second device being a device capable of communicating with the first device and providing a positioning function for the first device; and determine a location of the first device in the smart space semantic map, based on the communication with the second device;

based on the location of the first device and location relationship between the first device and the second device, determine the target operating device that does not have a function of being positioned.

13. The inter-device interactive control apparatus according to claim 12, wherein the processor is configured to determine the second device in the smart space semantic map by:

in response to the presence of multiple devices capable of communicating with the first device and providing a positioning function for the first device in the smart space semantic map, determining one or more second devices satisfying predetermined conditions among the multiple devices;

wherein the predetermined conditions comprise one or a combination of the following conditions:
the second device is a device with the smallest distance from the first device;
the second device is a device selected by a user;
the second device is a device having the same type of positioning component as the first device; and
the second device is a device located in a designated orientation of the first device.

14. The inter-device interactive control apparatus according to claim 13, wherein the target operation of the first device comprises an operation of the first device pointing to the target operating device; and
the processor is configured to determine the target operating device based on the location and the target operation of the first device by:
in response to the operation of the first device pointing to the target operating device, determining an orientation of the first device after the orientation changing relative to the location of the first device in the pre-established map, and determining the location of the second device in the pre-established map; and
determining, a device at a location of the orientation corresponding to the location of the second device in the pre-established map, as the target operating device, and determining a location of the target operating device in the pre-established map.

15. The inter-device interactive control apparatus according to claim 12, wherein
the processor is configured to determine the second device in the smart space semantic map by:
determining a second device belonging to the same sub-area as the first device in the smart space semantic map.

16. The inter-device interactive control apparatus according to claim 12, wherein
the processor is configured to determine the second device in the smart space semantic map by:
determining one or more sub-areas different from the sub-areas to which the first device belongs as one or more sub-areas used to determine the second device; and
determining the second device within the one or more sub-areas.

17. The inter-device interactive control apparatus according to claim 12, wherein the processor is configured to perform operations on the determined target operating device by:
establishing a connection with the determined target operating device;
displaying an interactive control interface for controlling the target operating device; and
controlling the target operating device, based on the operation performed on the interactive control interface.

* * * * *